(12) United States Patent
Baldini et al.

(10) Patent No.: US 9,054,354 B2
(45) Date of Patent: Jun. 9, 2015

(54) FUEL CELL WATER DISPOSAL

(75) Inventors: Augustus Baldini, Greene, NY (US); Richard Day, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 733 days.

(21) Appl. No.: 12/761,536

(22) Filed: Apr. 16, 2010

(65) Prior Publication Data

US 2011/0253465 A1 Oct. 20, 2011

(51) Int. Cl.
*H01M 8/04* (2006.01)
*B60L 11/18* (2006.01)
*B67D 7/12* (2010.01)

(52) U.S. Cl.
CPC ............ *H01M 8/04208* (2013.01); *H01M 8/04* (2013.01); *B60L 11/18* (2013.01); *B67D 7/12* (2013.01); *B60L 11/1883* (2013.01); *B60L 2200/42* (2013.01); *H01M 8/04186* (2013.01); *Y02E 60/50* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 6,161,562 A * | 12/2000 | Keefer et al. | 137/15.08 |
| 6,653,749 B2 | 11/2003 | Delbridge | |
| 6,994,932 B2 * | 2/2006 | Kinkelaar et al. | 429/447 |
| 7,063,906 B2 | 6/2006 | Matthews et al. | |
| 7,989,111 B2 | 8/2011 | Kubota | |
| 2003/0022050 A1 | 1/2003 | Barton et al. | |
| 2003/0096144 A1 | 5/2003 | Dunstan | |
| 2004/0194381 A1 | 10/2004 | Wheat et al. | |
| 2005/0153179 A1 | 7/2005 | Ukai et al. | |
| 2005/0202300 A1 | 9/2005 | Poirot-Crouvezier | |
| 2006/0078779 A1 | 4/2006 | Yu et al. | |
| 2007/0259227 A1 * | 11/2007 | Oishi et al. | 429/19 |
| 2009/0011299 A1 | 1/2009 | Yokoyama | |
| 2009/0068512 A1 | 3/2009 | Gofer et al. | |
| 2009/0087699 A1 * | 4/2009 | Takemoto et al. | 429/13 |
| 2009/0148732 A1 | 6/2009 | Forte et al. | |
| 2009/0208800 A1 * | 8/2009 | Ogawa | 429/26 |
| 2010/0279191 A1 * | 11/2010 | Matsuura et al. | 429/443 |

FOREIGN PATENT DOCUMENTS

| | | |
|---|---|---|
| CN | 21194242 Y | 2/2009 |
| JP | 2004060975 | 2/2004 |
| JP | 2005347190 | 12/2005 |
| WO | 2008090430 A1 | 7/2008 |

* cited by examiner

*Primary Examiner* — Milton I Cano
*Assistant Examiner* — Carmen Lyles-Irving
(74) *Attorney, Agent, or Firm* — Quarles & Brady LLP

(57) ABSTRACT

Automated systems and methods remove water from a fuel cell powered vehicle and eliminate the need for one or more separate steps to discharge the water. The water may be simultaneously drained or discharged from the vehicle holding tank while the fuel cell powered vehicle is being refueled.

16 Claims, 4 Drawing Sheets

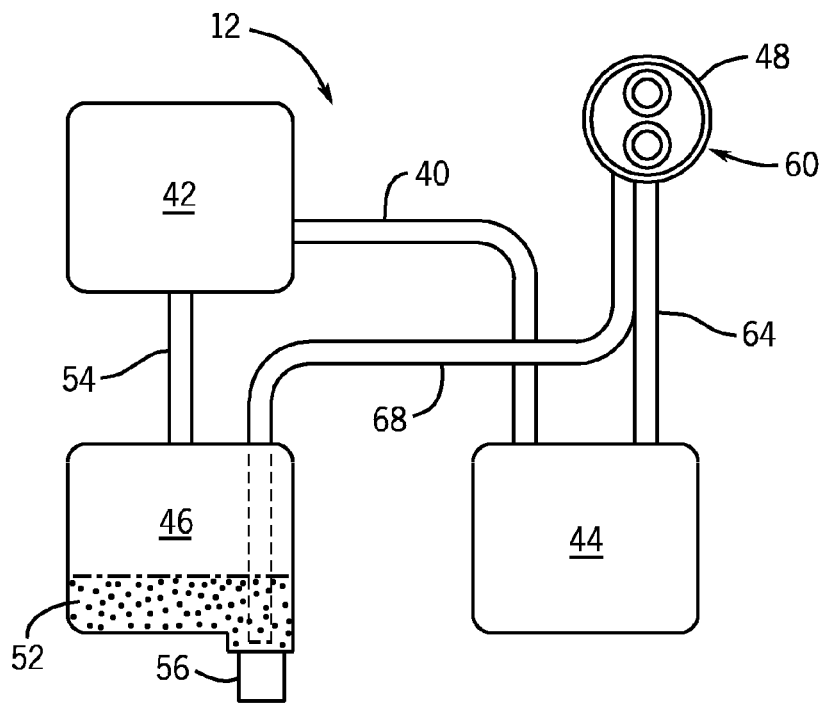
FIG. 2
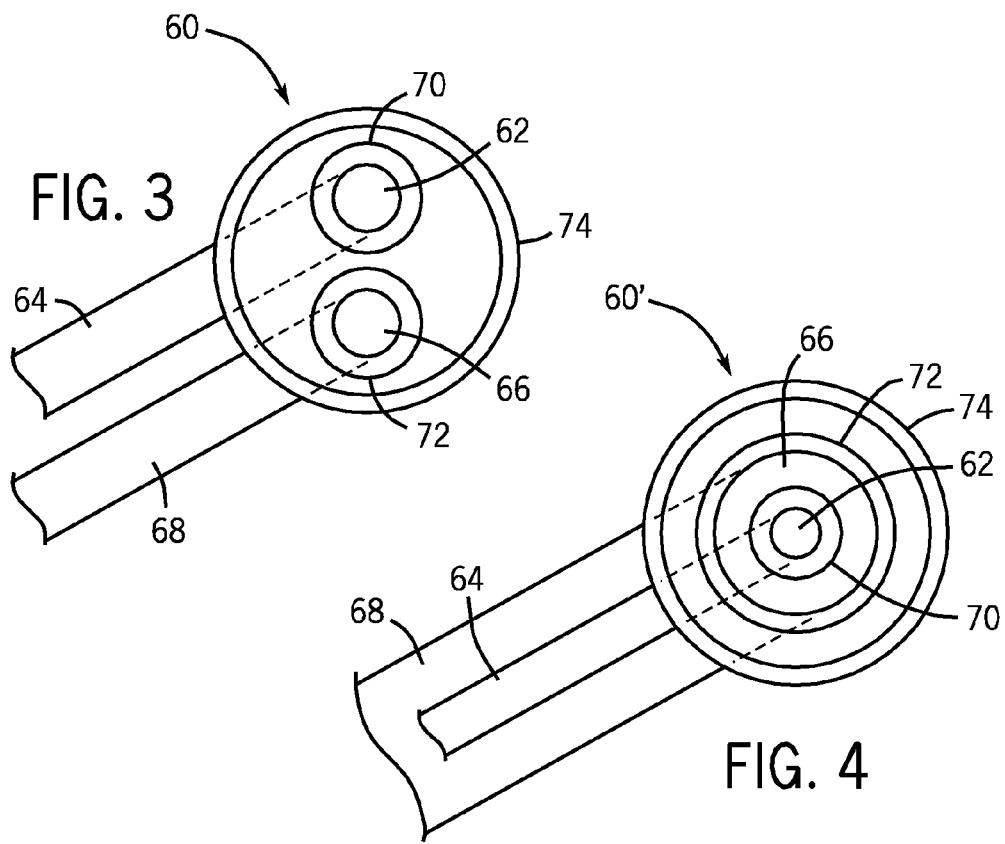
FIG. 3
FIG. 4

FUEL CELL WATER DISPOSAL

CROSS-REFERENCE TO RELATED APPLICATIONS

Not applicable.

STATEMENT CONCERNING FEDERALLY SPONSORED RESEARCH OR DEVELOPMENT

Not applicable.

FIELD OF THE INVENTION

The invention relates to the field of fuel cell powered devices, and more specifically to automatically discharging fuel cell generated water from a holding tank on-board a fuel cell powered vehicle.

BACKGROUND OF THE INVENTION

Fuel cells are well known and are commonly used to produce electrical energy by means of electrochemical reactions. The fuel cell produces electricity by bringing a fuel such as hydrogen, methanol, hydrocarbons, or natural gas, for example, and an oxidant, typically air, into contact with two suitable electrodes and an electrolyte.

When hydrogen is used as the fuel and air as the oxidant, the use of fuel cells in power generation offers potential environmental benefits because the by-products of such a reaction are heat and water. When other fuels and oxidants are employed, the by-products will accordingly differ. When compared to more conventional power generation equipment, e.g., fossil fuels or nuclear activity, fuel cells have advantages of less pollutant, lower noise generated, increased energy density and higher energy conversion efficiency. Fuel cell power generation is proportional to the consumption rate of the fuel and oxidant.

Fuel cells can be used in a wide variety of devices where electricity is required, including portable electronic products, home-use or plant-use power generation systems, large-size power generation systems, military equipment, the space industry, and vehicles such as automotive, truck, and bus power systems, as non-limiting examples.

A common problem that has to be addressed with fuel cell powered vehicles is the removal of water generated by the chemical reactions within the fuel cell. In operation, fuel cells produce an appreciable amount of water. This water needs to be removed from the vehicle in some way, and the removal presents an extra amount of effort and additional steps of work on the part of the vehicle operator.

Traditionally, the water or water vapors has been simply vented to the ambient environment outside the fuel cell system or allowed to drain or drip on the floor. These disposal methods may not be desirable depending upon the actual application of the fuel cell system. The water may also be stored in a holding tank for manual disposal later.

In the above examples, storage of the water in a storage tank for manual discharge at some later point may be preferred, yet manual discharge of the water presents an additional operational complication to the operation of the fuel cell powered vehicle. Vehicles equipped with other power sources do not require a comparable water discharge operation in addition to the operation of fueling. The additional water discharge step takes time and increases the amount of activity necessary to keep the fuel cell powered vehicle operational. Lack of removal of the water may also result in functional difficulties of the fuel cell or eventual curtailment of the use of the fuel cell powered vehicle until the water can be manually discharged.

It would therefore be desirable to incorporate automated systems and methods to remove the water and to eliminate the need for one or more separate steps to discharge the water from the vehicle. The water may be automatically drained or discharged from the holding tank while the fuel cell powered vehicle is being refueled.

SUMMARY OF THE INVENTION

The invention overcomes the drawbacks of the previous fuel cell powered vehicles by eliminating the need for one or more separate steps required to manually discharge the water from an on-board water holding tank.

The invention provides systems and methods of operating a fuel cell powered vehicle in which discharge of accumulated water from the water holding tank may be automated before, during, or after the fueling process. No specific additional actions are required on the part of the vehicle operator.

The automatic discharge operation may be self-timing, i.e., providing water capacity and drain time commensurate with the amount of time the vehicle is re-fueled and/or the amount of fuel supplied to the vehicle during refueling. Properly scaled, at least enough water will be drained from the vehicle holding tank as the replacement fuel will subsequently generate.

In one embodiment, an automatic drain system and method is provided that uses a pump within the fueling station (or alternatively the fuel cell system), wherein the nozzle used to refill the fuel tank on-board the vehicle also provides a suction, e.g., created by the pump, to draw the accumulated water from the vehicle holding tank and to an external holding tank or an appropriate drain.

In another embodiment, an automatic drain system and method is provided to open a drain valve on the water holding tank when a sensing system detects that fueling is in process, or that the lift truck is connected to a fueling nozzle. Actuation of the water drain valve at that time causes the water to drain into an appropriate catch basin or drain formed at or as part of the fueling station floor area.

In yet another embodiment, a method of removing water from a fuel cell powered vehicle comprises: collecting the water from the fuel cell in a holding tank, the fuel cell and holding tank disposed on the lift truck; coupling a fueling nozzle to a fueling fitting disposed on the lift truck, the fueling fitting being in fluid communication with the holding tank and a fuel tank; and after coupling the fueling nozzle to the fueling fitting, automatically discharging the water from the holding tank.

Yet another embodiment provides systems and methods comprising a fuel cell powered vehicle. A fuel cell is disposed on the vehicle and adapted to produce usable electrical energy and water. A fuel tank and a holding tank are also disposed on the vehicle. The fuel tank contains a supply of fuel for the fuel cell and the holding tank holds the water. A holding tank drain valve is in fluid communication with the holding tank. A fueling fitting is disposed on the vehicle and adapted to sealingly couple to a mating fueling nozzle. The vehicle also includes a sensing system on or near the fueling fitting, the sensing system adapted to sense at least one of the fueling nozzle coupled to the fueling fitting and fueling in process, and to open the holding tank drain valve to allow the water to drain when at least one of the fueling nozzle coupled to the fueling fitting and fueling in process is sensed.

In some embodiments, the sensing system is adapted to close the holding tank drain valve when at least one of the fueling nozzle coupled to the fueling fitting and fueling in process is not sensed. The drain valve may be sized and configured to discharge an amount of water during refueling that is greater than or equal to an amount of water that would be generated by the fuel cell when the fuel cell consumes the fuel that is supplied to the vehicle during the refueling.

In some embodiments, the fuel tank is sized and configured to receive a maximum supply of fuel, the maximum supply of fuel capable of generating an amount of water just less than or equal to a maximum capacity of the holding tank.

In some embodiments, a dual port fitting is disposed on the vehicle and is adapted to sealingly couple to a mating dual port fueling nozzle. A fueling conduit in fluid communication with the fuel tank and the dual port fitting, and a water conduit in fluid communication with the holding tank and the dual port fitting. A pumping system may be included to transfer the water from the holding tank through the water conduit and through the dual port fitting and through the dual port fuel nozzle. The fueling conduit and the water conduit are at least one of juxtaposed and coaxial at the dual port fitting.

In some embodiments, the dual port fitting comprises a fuel port and a water port. The dual port fitting is adapted to simultaneously receive fuel from the fueling nozzle to fill the fuel tank and to discharge water from the holding tank.

In some embodiments, the dual port fueling nozzle is in fluid flow communication with a fueling station, the fueling station including a fuel storage tank and at least one of a fueling station water storage tank and a drain. The fueling station may include a pumping system adapted to transfer the water from the holding tank through the water conduit and through the dual port fitting and through the dual port fuel nozzle and to at least one of the fueling station water storage tank and the drain.

In yet another embodiment, a method of removing water from a fuel cell powered vehicle comprises: collecting the water from the fuel cell in a holding tank, the fuel cell and holding tank disposed on the vehicle, coupling a fueling nozzle to a fueling fitting disposed on the vehicle, the fueling fitting being in fluid communication with the holding tank and a fuel tank, sensing at least one of the fueling nozzle coupled to the fueling fitting and fueling in process, and filling the fuel tank with fuel while simultaneously discharging the water from the holding tank.

In some embodiments, the fueling nozzle comprises a two port fueling nozzle and the fueling fitting comprises a mating two port fueling fitting. The method further includes coupling the two port fueling nozzle to the two port fueling fitting and discharging the water from the holding tank through the two port fueling fitting and through the two port fueling nozzle.

In some embodiments, the two port fueling nozzle is in fluid communication with a fueling station, and the fueling station comprises a fuel storage tank and at least one of a water storage tank and a floor drain. The method further includes discharging the water from the holding tank through the two port fueling fitting and through the two port fueling nozzle and to at least one of the water storage tank and the floor drain, and, simultaneously, refueling the vehicle by transferring fuel from the fuel storage tank through the two port fueling nozzle and through the two port fuel fitting and into a fuel tank on-board the vehicle.

In some embodiments, the method may also include, after coupling the fueling nozzle to the fueling fitting, discharging the water from the holding tank through a drain valve. Discharging the water from the holding tank through the drain valve may discharge the water into a floor drain.

In some embodiments, the vehicle comprises a lift truck including a tractor unit and a vertically movable platform mounted relative to the tractor unit. The platform is vertically movable between an upper position and a lower position.

In some embodiments, the vehicle comprises a lift truck including a tractor unit and a mast mounted relative to the tractor unit. The mast includes a fixed base and a vertically extendable mast section. A vertically movable platform is attached to the extendable mast section, the platform being vertically movable with the extendable mast section between an upper position and a lower position.

The foregoing and other objects and advantages will appear in the detailed description which follows. In the description, reference is made to the accompanying drawings which illustrate preferred embodiments of the invention.

BRIEF DESCRIPTION OF THE DRAWINGS

FIG. 2 is a schematic view of one embodiment of a fuel cell system configured to automatically discharge the water generated by the fuel cell;

FIG. 3 is a plan view of a two port fitting adapted for use with the fuel cell system shown in FIG. 2;

FIG. 4 is a plan view of an alternative two port fitting adapted for use with the fuel cell system shown in FIG. 2;

Figure 1:
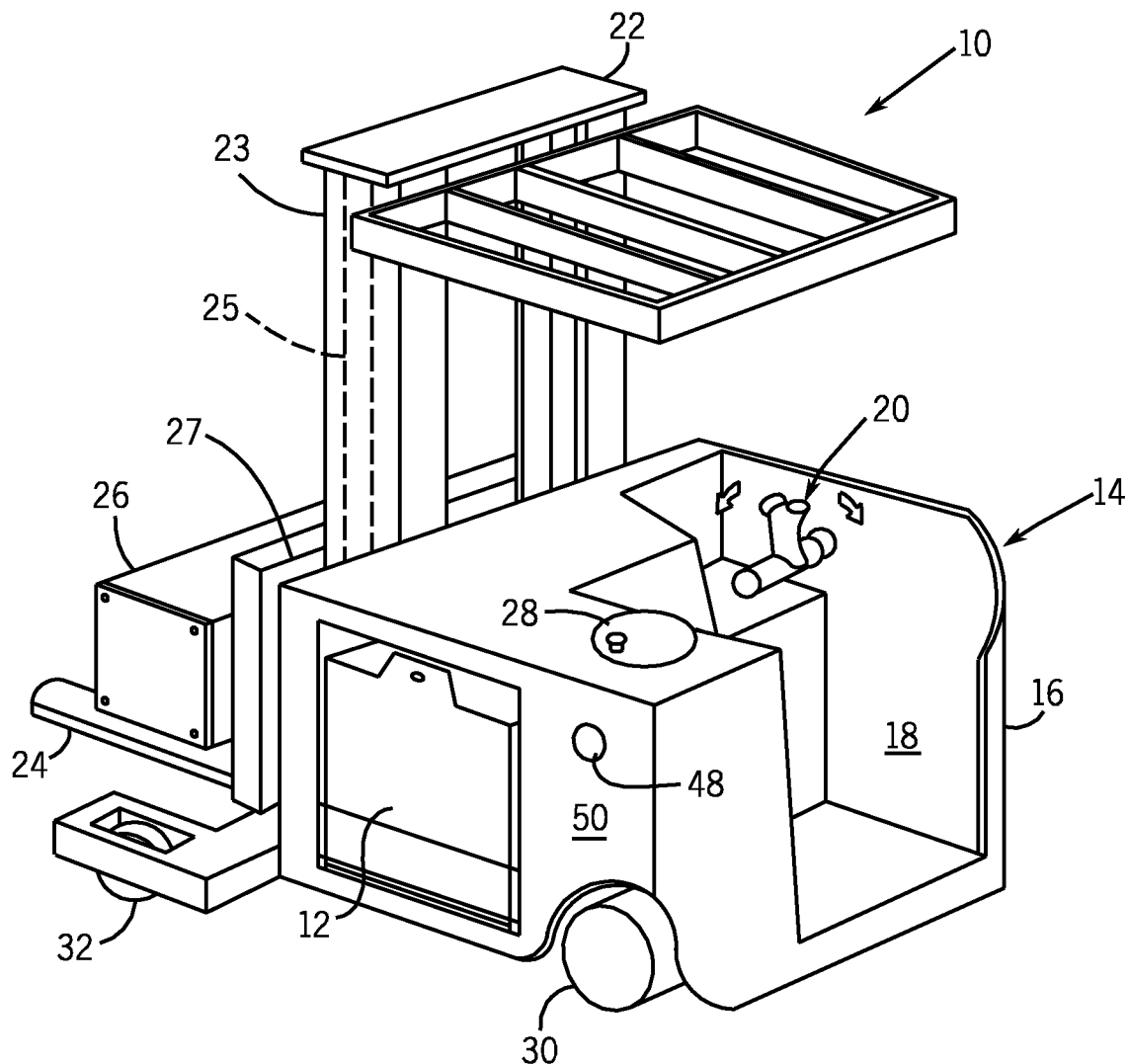
FIG. 1 is a perspective view of a vehicle employing a fuel cell system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

The invention will now be described more specifically with reference to the following embodiments. It is to be noted that the following descriptions of preferred embodiments are presented herein for purpose of illustration and description only. It is not intended to be exhaustive or to be limited to the precise form disclosed.

Referring now to the Figures, and more particularly to FIG. 1, the general arrangement of a representative vehicle, such as a lift truck 10, incorporating a fuel cell system 12 is shown. For simplicity, the detailed description will describe the embodiments associated with the lift truck 10 incorporating the fuel cell system 12. It is to be appreciated that the details of the invention may also be beneficial and adapted for a wide variety of devices and vehicles. Although the lift truck 10, by way of example, is shown as a standing, fore-aft stance operator configuration lift truck, it will be apparent to those of skill in the art that the features of the invention are not limited to vehicles of this type, and can also be provided in various other types of vehicles, including but not limited to, other material handling and lift vehicle configurations.

As seen, one embodiment of the lift truck 10 includes a tractor unit 14 comprising an operator compartment 16 with an opening 18 for entry and exit of the operator. The compartment 16 includes a control handle 20 mounted to the tractor 14 near the front of the operator compartment 16. A steering wheel 28 is also provided and is disposed above the turning wheel 30 it controls. The lift truck 10 includes two load wheels 32 proximate to a mast 22. The mast 22 is mounted relative to the tractor unit 14. The mast 22 includes a fixed base 23 and a vertically extendable mast section 25, with a platform 27 attached to the extendable mast section 25. The extendable mast section 25 raises and lowers the platform 27. The platform 27 is shown including forks 24 and carrying a load 26.

Referring to FIGS. 1 and 2, the lift truck 10 is shown to include a fuel cell system 12. The fuel cell system 12 comprises a variety of components, including a fuel cell 42 in fluid communication with a fuel tank 44 and a water holding tank 46. A fueling fitting 48 is shown on a side 50 of the tractor unit 14. The fueling fitting 48 provides access for a fueling nozzle to refuel the fuel cell 12 in a similar fashion to refueling a gasoline powered vehicle. In certain embodiments, the fueling fitting 48 also provides access for discharging water from the holding tank 46. Optionally, the holding tank 46 also includes a drain valve 56 for water discharge.

Fuel from the fuel tank 44 passes through a fuel line 40 and is available for the fuel cell 42. As previously described, as the fuel cell 42 consumes the fuel and an oxidant, the output includes electrical power and water 52. Thus, as fuel is consumed from the fuel tank 44, the water from the fuel cell 42 is collected in the water holding tank 46. The water 52 flows from the fuel cell 42 through a holding tank conduit 54 (or directly) into the holding tank 46 by way of gravity. It is to be appreciated that the water 52 may also be pumped or otherwise transferred to the holding tank during operation of the fuel cell 42.

One or both of the water holding tank 46 and the fuel tank 44 may be sized accordingly so as the fuel is consumed from the fuel tank, there is sufficient space in the water holding tank 46 to hold the water generated. In a desirably sized system, as the last of the fuel is consumed, the water holding tank 46 is at or near capacity.

Referring now to FIGS. 3 and 4, alternative configurations of the fueling fitting 48 are shown. As seen in FIG. 3, the two-port fitting 60 includes a first port 62 for providing fuel to the fuel tank 44 through a fuel conduit 64, and a juxtaposed second port 66 for removing water from the holding tank 46 through water conduit 68. One or more seals 70, 72, 74 may be included, as would be known in the art, to provide a sealed fitting to a fueling nozzle 80, to be described below. FIG. 4 shows an alternative two-port fitting 60' where the first port 62 and the second port 66 are configured, for example, to be one inside the other, i.e., as shown to be generally coaxial.

Figure 5:
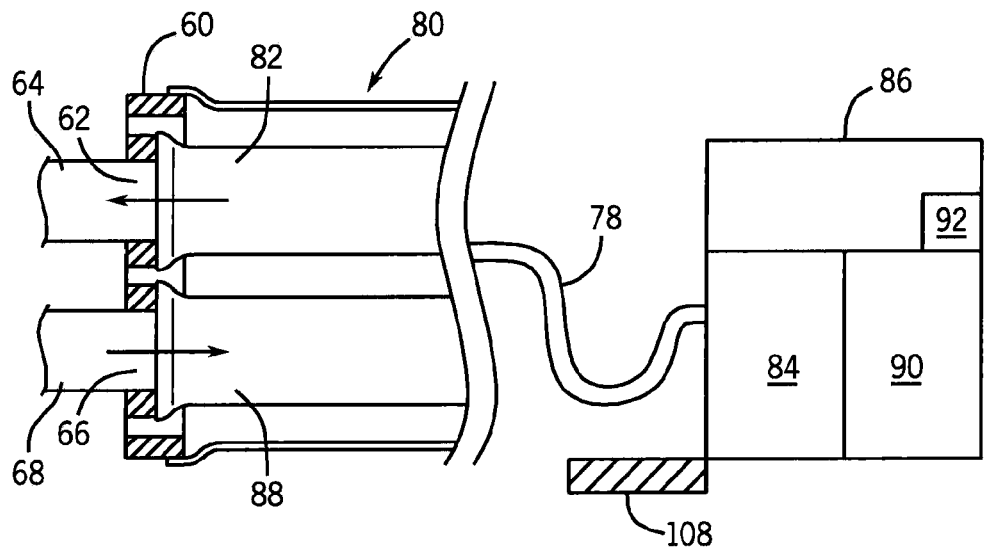
FIG. 5 is a side view in partial section of a fueling nozzle sealingly coupled to the two port fitting of FIG. 3, and coupled to a fueling station via a fueling hose.

Referring now to FIG. 5, the fueling nozzle 80 is used to refuel the fuel cell 12. The fueling nozzle 80 is shown coupled to a fueling pump or station 86 via hose 78, and sealingly coupled to the two port fitting 60. The fueling nozzle 80 includes a mating channel 82 for providing a fluid flow path for the fuel from a fuel storage tank 84 at the fueling station 86 to the first port 62 on the two port fitting 60. When used with this two port fitting, the fueling nozzle 80 may also be fitted with a mating channel 88, as shown, for providing a fluid flow path to discharge the water 52 from the water holding tank 46. The water is discharged from the holding tank 46 through the water conduit 68 and second port 66, through mating channel 88, and to the water storage tank 90 at the fueling station 86. The water storage tank 90 desirably has a greater capacity than the holding tank 46 on the lift truck 10.

When the fueling nozzle 80 is properly connected to the two-port fitting 60 as shown, the fueling process may begin, and simultaneously, or before or after the fueling process, a water pumping system 92 draws, e.g., suctions, the accumulated water from the water holding tank 46 through the water conduit 68 and the fueling nozzle 80 to the water storage tank 90. It is to be appreciated that the pumping system 92 may comprise a component of the fueling station 86, as shown, or alternatively, the pumping system 92 may be incorporated into the fuel cell system 12 on the lift truck 10. The pumping system may include any known pump configuration useful to pump fluids (e.g., a piston pump, a blower, a turbine, a fan, a linear pump, a rotary vane pump, a centrifugal pump, a reciprocating pump, a diaphragm pump or combinations thereof, as non-limiting examples), and may be manually operated or automatically operated (e.g., AC or DC electrically powered).

In this way, the water is automatically transferred from the holding tank 46 on-board the lift truck 10 to the water storage tank 90 at the fueling station 86 every time the fuel cell system 12 is fueled. Alternatively, the water may be transferred from the holding tank 46 to an appropriate drain 108. The capacity of the water holding tank 46 may be sized as a direct function of the amount of fuel consumed, thus, related directly to the size of the fuel tank 44 storage capacity. Therefore, the fueling operation time can always be appropriate to the amount of time the pumping system 92 requires to drain the accumulated water 52, whether for partial or complete re-fueling.

Figure 6:
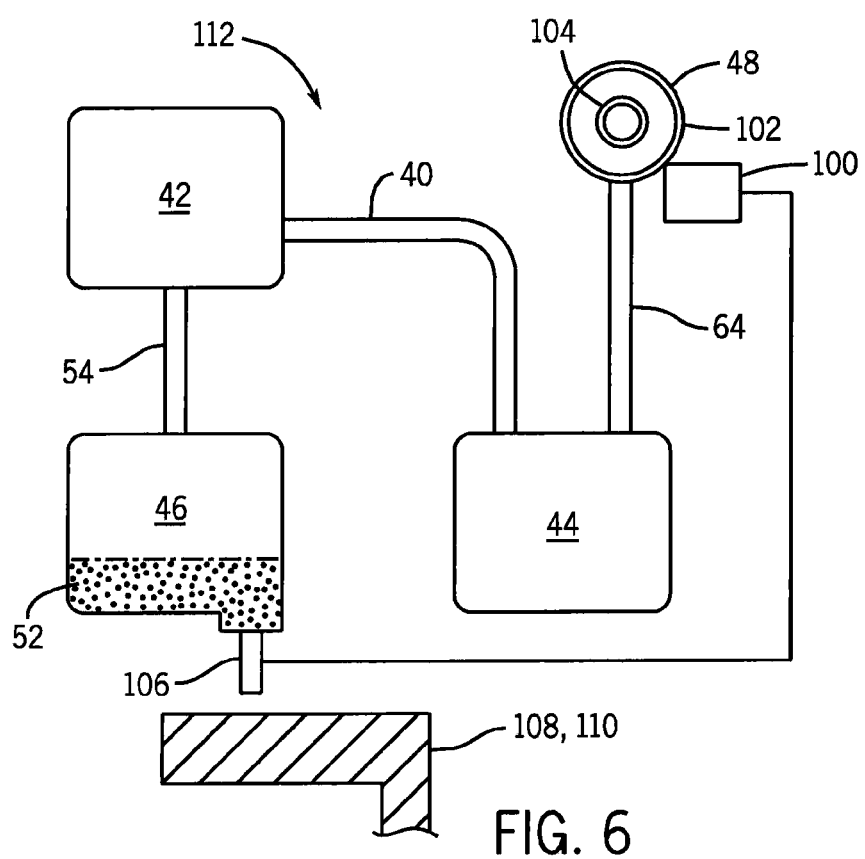
FIG. 6 is a schematic view of an alternative embodiment of a fuel cell system configured to automatically discharge the water generated by the fuel cell.

Referring to FIG. 6, an alternative embodiment of a fuel cell system 112 is shown. In the Figure, like components are given the same reference numerals as in FIGS. 1-2. For simplicity and brevity the description of these components is not repeated.

In this embodiment, a sensing system 100 is adapted to sense when the fueling nozzle 80 is either coupled to the fueling fitting 102 and/or when fueling is in process. A variety of sensing devices would be apparent to those of skill in the art, such as a switch, a fluid flow sensor, a mechanical link, a hydraulic link, and/or a pneumatic link, as non-limiting examples. In this embodiment, the fueling fitting 102 may comprise a single fuel port 104 for fuel transfer. When either are sensed, (i.e., when the fueling nozzle 80 is either coupled to the fueling fitting 102 and/or when fueling is in process), the sensing system 100 causes a drain valve 106, (e.g., an open/close solenoid valve), on the water holding tank 46 to open and allow the water 52 to drain. In one embodiment, the sensing system 100 may be positioned on or near the fueling fitting 102 so as to detect when the fueling nozzle 80 is coupled to the fueling fitting 102. In another embodiment, or in combination, the sensing system 100 may be positioned to detect the flow of fuel through the fueling fitting and/or through the fuel conduit 64, and/or to detect the pressure of the incoming fuel.

The fueling station 86 location may be equipped with one or more suitable floor drains 108 to collect the water, and/or the water 52 may be allowed to drain to a building drain system 110, for example. When fueling is completed or stopped, and/or when the fueling nozzle 80 is removed from the fueling fitting 102, the sensing system 100 would sense either condition and cause the drain valve 106 on the water holding tank to close.

Similar to the fuel cell system 12 described above including a pumping system 92, this fuel cell system 112 also provides an automatic drain process, and, similar to the pumping configuration, may be self-timing, providing drain time proportional to the amount of fuel supplied to the vehicle.

Figure 7:
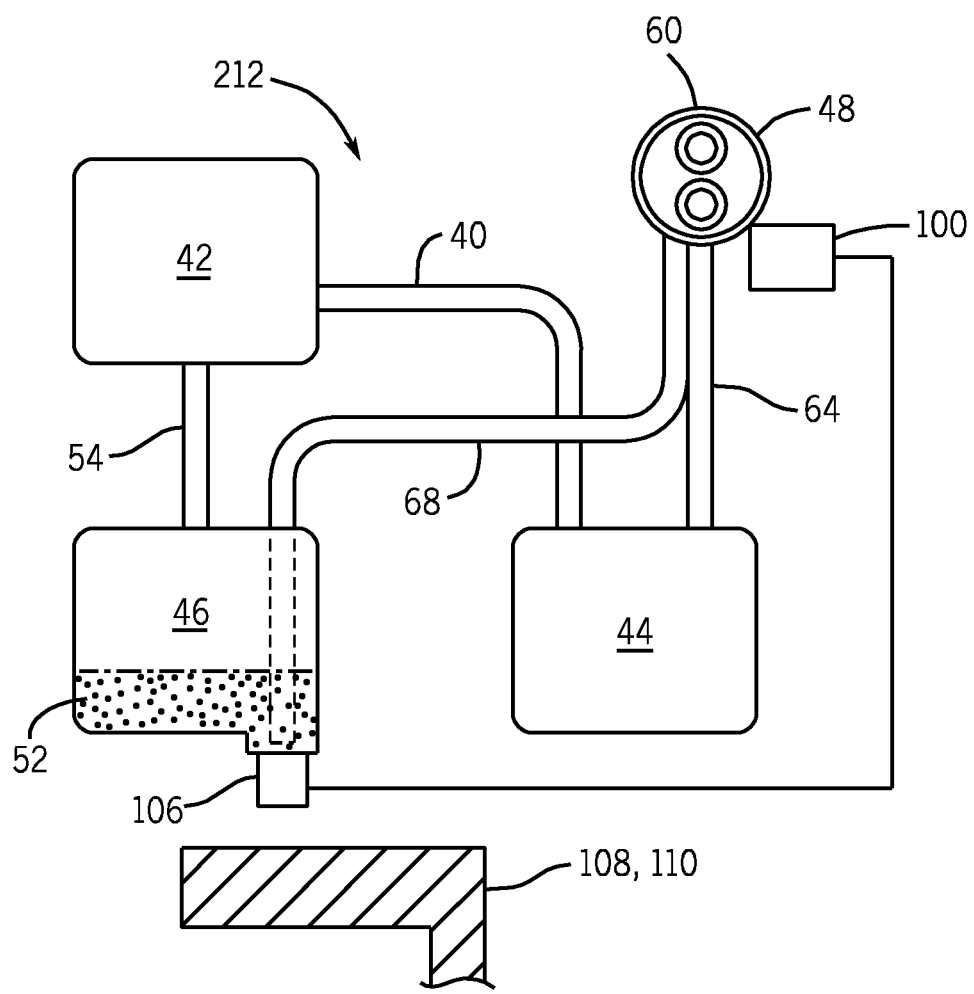
FIG. 7 is a schematic view of an additional alternative embodiment of a fuel cell system configured to automatically discharge the water generated by the fuel cell.

FIG. 7 shows an additional alternative embodiment of a fuel cell system 212, which incorporates the ability to utilize either or both the pumping system 92 and the sensing system 100 as described above. When the lift truck 10 is being fueled and/or is coupled to a fueling nozzle 80, the pumping system 92 may withdraw water from the holding tank 46 or, the sensing system 100 may drain the holding tank 46 through the drain valve 106. Combining the pumping system 92 and the sensing system 100 as part of the fuel cell system 212 allows the user of the lift truck 10 additional flexibility to refuel the lift truck and discharge water at a fueling station that may or may not have available the two port fueling nozzle 80, and may only have available a drain 108.

Preferred embodiments have been described in considerable detail. Many modifications and variations to the preferred embodiment described will be apparent to a person of ordinary skill in the art. Therefore, the invention should not be limited to the embodiments described.

We claim:

1. A fuel cell powered vehicle comprising:
   a fuel cell disposed on the vehicle to produce usable electrical energy and water;
   a fuel tank disposed on the vehicle to contain a supply of fuel for the fuel cell;
   a holding tank disposed on the vehicle to hold the water produced by the fuel cell;
   a holding tank drain valve in fluid communication with the holding tank;
   a fueling fitting disposed on the vehicle that seals with a mating fueling nozzle;
   a sensing system including a sensor to sense the fueling nozzle coupled to the fueling fitting and to open the holding tank drain valve to allow the water to drain when the fueling nozzle coupled to the fueling fitting is sensed; and
   a pressure sensor for sensing a pressure of incoming fuel.

2. The vehicle according to claim 1:
   wherein the sensing system is on or near the fueling fitting.

3. The vehicle according to claim 1:
   wherein the sensing system closes the holding tank drain valve when the fueling nozzle coupled to the fueling fitting is not sensed.

4. The vehicle according to claim 1:
   wherein the fuel tank is sized and configured to receive a maximum supply of fuel, the maximum supply of fuel capable of generating an amount of water just less than or equal to a maximum capacity of the holding tank.

5. The vehicle according to claim 1:
   wherein the drain valve is sized and configured to discharge an amount of water during refueling that is greater than or equal to an amount of water that would be generated by the fuel cell when the fuel cell consumes the fuel that is supplied to the vehicle during the refueling.

6. The vehicle according to claim 1:
   wherein the vehicle comprises a lift truck, the lift truck including a tractor unit and a vertically movable platform mounted relative to the tractor unit, the platform being vertically movable between an upper position and a lower position.

7. The vehicle according to claim 1:
   wherein the vehicle comprises a lift truck, the lift truck including a tractor unit;
   a mast mounted relative to the tractor unit, the mast including a fixed base and a vertically extendable mast section; and
   a vertically movable platform attached to the extendable mast section, the platform being vertically movable with the extendable mast section between an upper position and a lower position.

8. The vehicle according to claim 1:
   further including a dual port fitting disposed on the vehicle to sealingly couple to a mating dual port fueling nozzle;
   a fueling conduit in fluid communication with the fuel tank and the dual port fitting; and
   a water conduit in fluid communication with the holding tank and the dual port fitting.

9. The vehicle according to claim 8:
   further including a pumping system to transfer the water from the holding tank through the water conduit and through the dual port fitting and through the dual port fueling nozzle.

10. The vehicle according to claim 8:
    wherein the dual port fitting comprises a fuel port and a water port.

11. The vehicle according to claim 8:
    wherein the fueling conduit and the water conduit are at least one of juxtaposed and coaxial at the dual port fitting.

12. The vehicle according to claim 8:
    wherein the dual port fitting simultaneously receives fuel from the dual port fueling nozzle to fill the fuel tank and to discharge the water from the holding tank.

13. The vehicle according to claim 8:
    wherein the dual port fueling nozzle is in fluid flow communication with a fueling station, the fueling station including a fuel storage tank and at least one of a fueling station water storage tank and a drain.

14. The vehicle according to claim 13:
    the fueling station further including a pumping system to transfer the water from the holding tank through the water conduit and through the dual port fitting and through the dual port fueling nozzle and to at least one of the fueling station water storage tank and the drain.

15. A fuel cell powered vehicle comprising:
    a fuel cell disposed on the vehicle to produce usable electrical energy and water;
    a fuel tank disposed on the vehicle to contain a supply of fuel for the fuel cell;
    a holding tank disposed on the vehicle to hold the water produced by the fuel cell;
    a holding tank drain valve in fluid communication with the holding tank;
    a dual port fitting disposed on the vehicle to sealingly couple to a mating dual port fueling nozzle, the duel port fueling nozzle to provide the supply of fuel for the fuel tank and to remove the water produced by the fuel cell from the holding tank;
    a fueling conduit in fluid communication with the fuel tank and the dual port fitting; and
    a water conduit in fluid communication with the holding tank and the dual port fitting.

16. The vehicle according to claim 15:
    further including a sensing system to detect a pressure of the supply of fuel.

* * * * *